United States Patent [19]

Kawabata et al.

[11] 4,274,504
[45] Jun. 23, 1981

[54] POWER STEERING DEVICE

[75] Inventors: Minoru Kawabata, Aichi; Mikio Suzuki, Hekinan; Kenji Takahashi, Kariya, all of Japan

[73] Assignees: Toyoda Koki Kabushiki K., Kariya; Toyota Jidosha Kogyo Kabushiki Kaisha, Toyota, both of Japan

[21] Appl. No.: 67,456

[22] Filed: Aug. 17, 1979

[30] Foreign Application Priority Data

Aug. 24, 1978 [JP] Japan .............................. 53-103113
Aug. 24, 1978 [JP] Japan .............................. 53-103114

[51] Int. Cl.³ .............................................. B62D 5/08
[52] U.S. Cl. ................................................. 180/143
[58] Field of Search ...................... 180/143, 142, 141; 91/434

[56] References Cited
U.S. PATENT DOCUMENTS 3,924,705 12/1975 Sugisawa .......................... 180/143
3,948,338 4/1976 Toshioka et al. .................. 180/143

*Primary Examiner*—John A. Pekar
*Attorney, Agent, or Firm*—Oblon, Fisher, Spivak, McClelland & Maier

[57] ABSTRACT

In a power steering device for a vehicle, a first spool valve member is slidably received in a valve housing and is supplied with a steering pressure generated in response to a manual steering torque. A second spool valve member is slidably received in the first spool valve member and is supplied with a control pressure depending upon a vehicle speed. Bypass means is formed on the first and second spool valve members to be actuated by the control pressure to communicate both cylinder chambers of a manual steering torque supplementing hydraulic actuator with each other. Relative displacement between the first and second spool valve members is caused by the steering pressure to act to close the bypass means.

5 Claims, 7 Drawing Figures

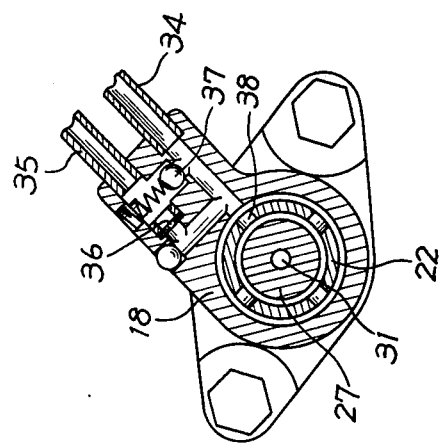
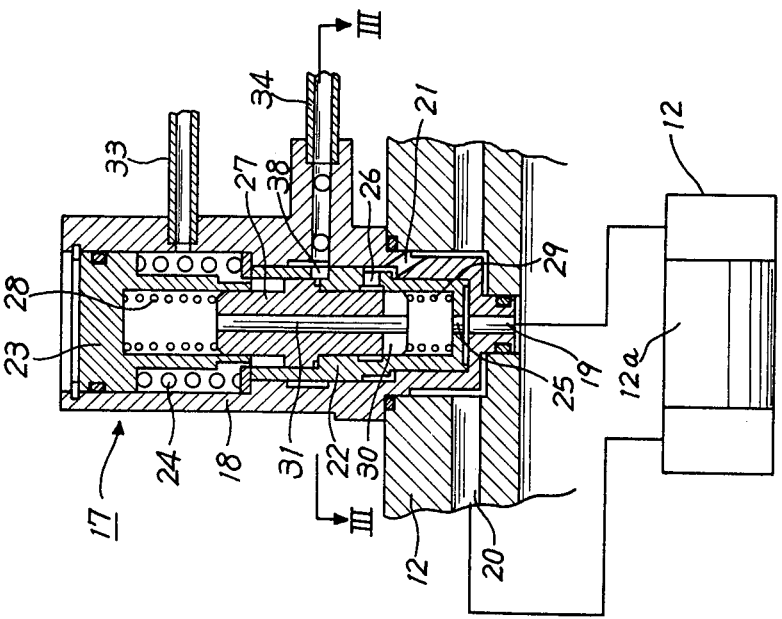

POWER STEERING DEVICE

BACKGROUND OF THE INVENTION

1. Field of the Invention

The present invention relates to a power steering device of the type for communicating both cylinder chambers of a power cylinder with each other in response to a vehicle speed.

2. Description of the Prior Art

In a power steering device, in order to prevent the manipulation of a steering wheel at the high speed running of the vehicle from being too light, it has been adopted to communicate both cylinder chambers of a power cylinder with each other in response to a vehicle speed to thereby decrease the steering gain. Accordingly, in the power steering device of this type, there has been provided a bypass valve for controlling the communication of both cylinder chambers in response to the vehicle speed.

However, when the steering wheel is abruptly turned at the high speed running of the vehicle, the manipulation of the steering wheel becomes heavy due to the decrease in the steering gain to thereby give an operator an anxious feeling.

SUMMARY OF THE INVENTION

It is, therefore, an object of the present invention to provide a new and improved power steering device of the type for communicating both cylinder chambers of a power cylinder with each other in response to a vehicle speed, which is capable of making an abrupt manipulation of a steering wheel light at the high speed running of the vehicle.

Another object of the present invention is to provide a new and improved power steering device of the character set forth above, wherein a spool valve member is moved by steering pressure to close bypass means serving to communicate both cyinder chambers with each other in response to the vehicle speed.

Briefly, according to the present invention, these and other objects are achieved by providing a power steering device of a vehicle, mentioned below. A hydraulic actuator has two cylinder chambers for supplementing manual steering torque. Servo valve means is provided for controlling directions of pressure fluid to be supplied to the hydraulic actuator in response to manual steering. A first spool valve member is slidably received in a valve housing and is supplied with a steering pressure generated in response to the manual steering torque to be moved in one direction. A second spool valve member is slidably received in the first spool valve member and is supplied with a control pressure depending upon the vehicle speed to be moved in the one direction relative to the first spool valve member. Bypass means is formed on the first and second spool valve members to be opened by the relative displacement between the first and second spool valve members caused by the control pressure to communicate both of the cylinder chambers of the hydraulic actuator with each other. Spring means is interposed between the valve housing and the second spool valve member to urge the second spool valve member in the other direction to close the bypass means. The spring means is calibrated in such a manner that the displacement of the first spool valve member by the steering pressure causes displacement of the second spool valve member by an amount different from that of the first spool valve member thereby to act to close the bypass means.

BRIEF DESCRIPTION OF THE DRAWINGS

The foregoing and other objects and many of the attendant advantages of the present invention will be readily appreciated as the same becomes better understood by reference to the following detailed description, when considered in connection with the accompanying drawings, in which:

FIG. 2 is a sectional view of a bypass valve;

FIG. 3 is a sectional view taken along the lines III—III in FIG. 2;

DETAILED DESCRIPTION OF THE PREFERRED EMBODIMENT

Figure 1:
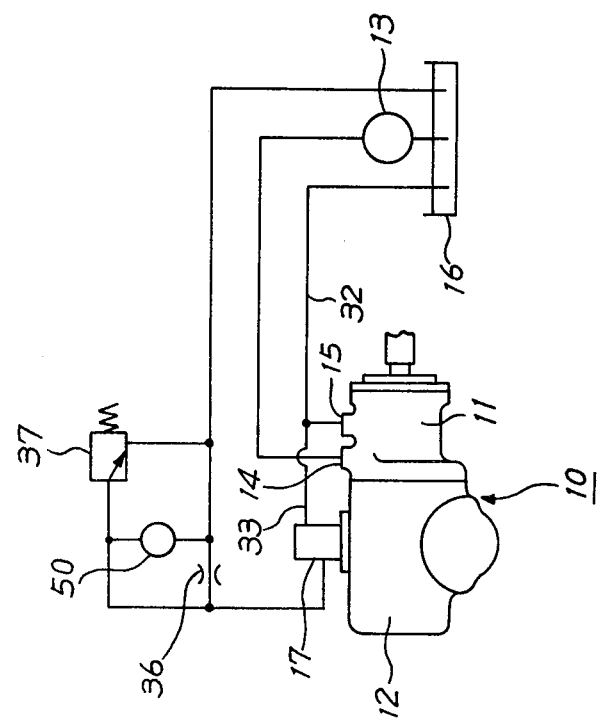
FIG. 1 is a schematic view of a power steering device with a hydraulic control circuit therefor.

Referring now to the drawings, wherein like reference numerals or characters refer to identical or corresponding parts throughout the several views, and more particularly to FIG. 1, there is shown a power steering device 10 comprising a valve housing 11 containing therein a servo valve, not shown, and a power cylinder 12 receiving a piston 12a. When the servo valve is actuated by manipulating a manual steering wheel, not shown, pressurized fluid is supplied from a pump 13 through a supply port 14 formed on the valve housing 11 into one of the cylinder chambers of the power cylinder 12, while fluid in the other cylinder chamber is exhausted from an exhaust port 15 formed on the valve housing 11 through an exhaust conduit 32 into a reservoir 16. This power steering device 10 is conventional and disclosed, for example, in U.S. Pat. No. 3,408,900, the disclosure of which is hereby incorporated by reference. There is provided on the power cylinder 12 a bypass valve 17 for controlling the communication and shut-off between the cylinder chambers of the power cylinder 12 in accordance with a vehicle speed.

Referring to FIGS. 2 and 3, the bypass valve 17 comprises a valve housing 18 which is formed with port 19 communicating with the right cylinder chamber of the power cylinder 12 and port 21 which is connected to the left cylinder chamber of the power cylinder 12 via passage 20, respectively. A first spool valve 22 is slidably received in the valve housing 18 and is normally held at its lower end position by means of a spring 24 interposed between one end thereof and an end cap 23 secured to one end of the valve housing 18. The first spool valve 22 is formed at its bottom end with a port 25 communicating with the port 19 and at its stepped portion with a port 26 communicating with the port 21. The effective area where fluid pressure from the port 19 urges the first spool valve 22 upward is made equal to that where fluid pressure from the port 21 urges the first spool valve 22 upward. That is, $$(D_2^2 - D_3^2) = (D_1^2 - D_2^2)$$

where $D_1$ = outer diameter of the first spool valve 22

$D_2$ = diameter of the reduced portion of the first spool valve 22

$D_3$ = inner diameter of the first spool valve 22

A second spool valve 27 is slidably received in the first spool valve 22. The upper portion of the second spool valve 27 is slidably inserted into the projected portion of the end cap 23. A spring 28 is interposed between the upper end of the second spool valve 27 and the end cap 23 so as to urge the second spool valve 27 downward, while a spring 29 is interposed between the bottom portion of the first spool valve 22 and the lower end of the second spool valve 27 to urge the second spool valve upward. The second spool valve 27 is normally held at its lower end position by means of the spring 28. The second spool valve 27 is formed at its lower end with a slit 30 serving as a throttle. When the second spool valve 27 is moved upward relative to the first spool valve 22, the slit 30 communicates with the port 26. The degree of communication between the slit 30 and the port 26 is increased, as the second spool valve 27 is moved upward relative to the first spool valve 22. Accordingly, the left and right cylinder chambers of the power cylinder 12 are communicated with each other through the ports 20, 21, 26, the slit 30 and the ports 25, 19.

A back-pressure conduit 33 is connected at its one end with the valve housing 18 and at its other end with the exhaust conduit 32 which connects the exhaust port 15 of the power steering device 10 with the reservoir 16. Back pressure due to line resistance is generated in the exhaust conduit 32. This back pressure is changed in accordance with change in fluid temperature or viscosity, so that back pressure depending upon fluid temperature is applied in the conduit 33. The back pressure in the conduit 33 is applied on the top surface of an enlarged portion of the second spool valve 27 to urge the second spool valve 27 downward in cooperation with the spring 28, to thereby act to close the communication between the slit 30 and the port 26.

Connected to the valve housing 18 are a pressure conduit 34 for admitting therein pressurized fluid delivered from a trochoid pump, which is described later, and one end of an exhaust conduit 35 which is connected at its other end to the reservoir 16. A throttle valve 36 and a relief valve 37 for setting the pressure of fluid introduced into the pressure conduit 34 below a predetermined value are provided between the pressure conduit 34 and the exhaust conduit 35. Fluid pressure in the pressure conduit 34 is applied to the enlarged portion of the second spool valve 27 through a port 38 of the first spool valve 21 to move the second spool valve 27 upward against the back pressure and the spring 28, to thereby act to open the communication between the slit 30 and the port 26.

Figure 5:
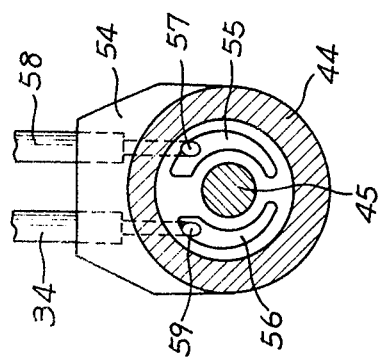
FIG. 5 is a sectional view taken along the lines V—V in FIG. 4.
Figure 4:
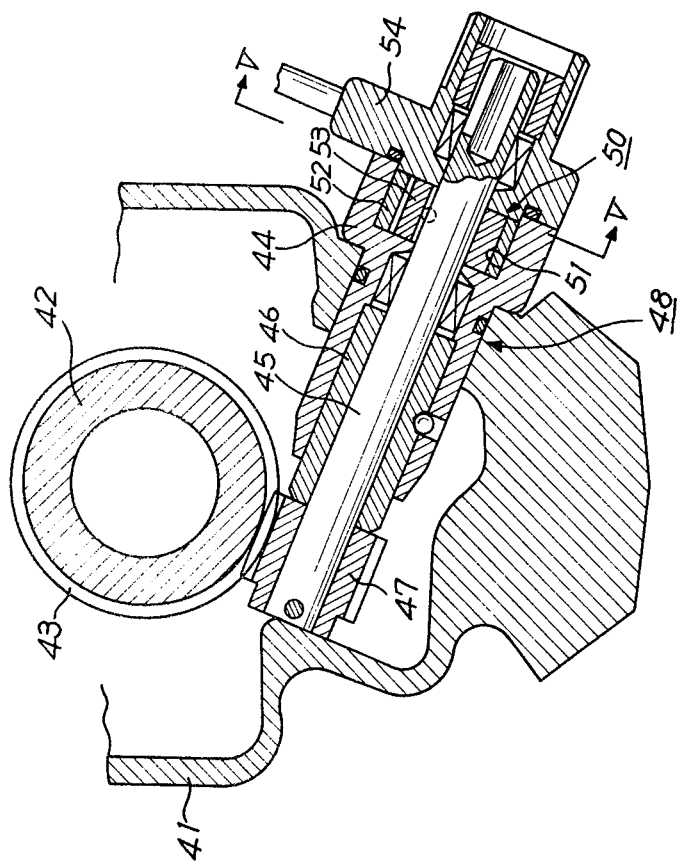
FIG. 4 is a sectional view of a speed detector incorporating a trochoid pump.

Description is now made of a fluid pressure generating device for generating fluid pressure depending upon a vehicle speed, with reference to FIGS. 4 and 5. A reference numeral 41 denotes a transmission case of a vehicle. An engine output shaft 42 connected to a propeller shaft, not shown, is rotatably journalled by the transmission case 41. A drive gear 43 in helical form is mounted on the output shaft 42. A detector housing 44 is inserted into and secured to the transmission case 41 and rotatably supports a drive shaft 45 through a sleeve 46. The drive shaft 45 carries at its one end a driven gear 47 in meshing engagement with the drive gear 43. The other end of the drive shaft 45 is connected to a speed meter through a cable, not shown, which thereby constitutes a conventional speed detector 48.

A conventional trochoid pump 50 is incorporated into the speed detector 48. A cylindrical bore 51 is formed in the detector housing 44 in such a manner that the axis thereof is eccentric by a predetermined distance relative to the axis of the drive shaft 45. An outer rotor 52 having an inner gear with n teeth is rotatably received in the cylindrical bore 51. An inner rotor 53 is secured on the drive shaft 45 and is provided with an outer gear with (n−1) teeth which is in meshing engagement with the inner gear of the outer rotor 52. A member 54 is secured to one end of the detector housing 44 and formed at its one side wall with inlet and outlet ports 55 and 56, as shown in FIG. 5. The inlet port 55 is connected to the reservoir 16 through an inlet passage 57 and an inlet conduit 58. The outlet port 56 is connected to the pressure conduit 34 through an outlet passage 59. Accordingly, when the trochoid pump 50 is actuated by the drive shaft 45, fluid is sucked into the inlet port 55 from the reservoir 16 and pressurized fluid is delivered into the pressure conduit 34 from the outlet port 56. This pressurized fluid is restrictively exhausted into the reservoir 16 through the throttle valve 36, shown in FIG. 3. Therefore, fluid pressure depending upon rotation of the trochoid pump 50 or the vehicle speed is applied on the second spool valve 27.

Figure 6:
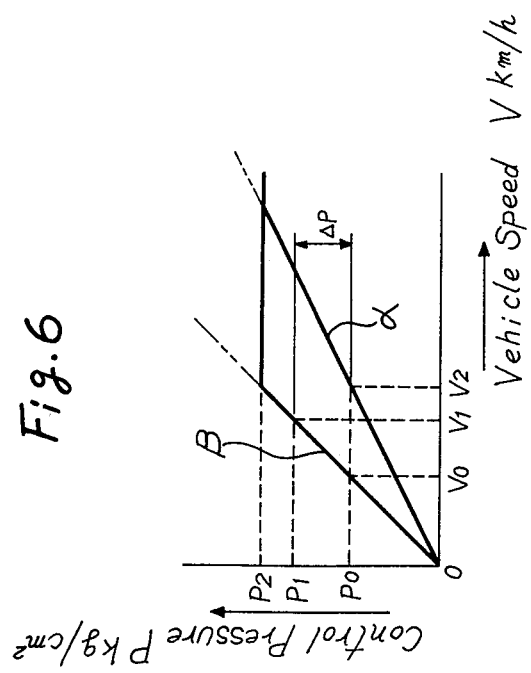
FIG. 6 shows a relationship between a vehicle speed and a control pressure of the pump.

FIG. 6 shows relationship between vehicle speed V and fluid pressure P delivered from the trochoid pump 50, wherein a curve $\alpha$ shows the state where fluid is at the normal temperature T1 degree and curve $\beta0$ shows the state where fluid is at the temperature T2, lower than the normal temperature T1. It is seen from FIG. 6 that the rising gradient of the curve $\beta$ is steeper than that of the curve 60, since fluid viscosity is higher at the lower fluid temperature and thus an amount of exhaust fluid is more restricted by the throttle valve 36. It is also seen from FIG. 6 that the fluid pressure P is not increased to a value higher than a value P2 set by the relief valve 37.

In operation, when the engine output shaft 42 is rotated, the inner rotor 53 of the trochoid pump 50 is rotated through the drive gear 43, the driven gear 47 and the drive shaft 45, so that fluid is sucked from the reservoir 16 through the inlet passage 58 into the inlet port 55 and pressurized fluid is delivered from the outlet port 56 into the pressure conduit 34. The pressurized fluid in the pressure conduit 34 is applied on the lower surface of the enlarged portion of the second spool valve 27 through the port 38 of the first spool valve 22. Since a portion of the pressurized fluid is exhausted through the throttle valve 36 to the reservoir 16, fluid pressure applied on the lower surface of the enlarged portion of the second spool valve 27 is proportional to the rotational speed of the engine output shaft 42 or the vehicle speed.

Since a predetermined amount of pressurized fluid is always supplied from the pump 13 into the supply port 14 of the power steering device 10 and fluid is exhausted from the exhaust port 15 through the exhaust conduit 32 into the reservoir 16, back pressure is generated in the exhaust conduit 32 and applied through the back pressure conduit 33 on the top surface of the enlarged portion of the second spool valve 27.

Accordingly, when the vehicle is running at a relatively low speed, the following relationship is established.

$$P \cdot A + F1 < Pb \cdot A + F2$$

where
P: control pressure from trochoid pump 50
Pb: back pressure
A: effective area of the top and lower surfaces of the enlarged portion of the second spool valve 27
F1: urging force of spring 29
F2: urging force of spring 28

As a result, the second spool valve 27 is not displaced, thereby maintaining the closing of communication between both of the cylinder chambers in the power cylinder 12, so that the power steering device 10 is operated in the normal way.

As the vehicle speed is increased, the control pressure P from the trochoid pump 50 is increased. When the vehicle speed reaches to a predetermined value, for example 60 km/h, the following relationship is established.

$$P \cdot A + F1 > Pb \cdot A + F2$$

As a result, the second spool valve 27 is moved upward, so that the slit 30 communicates with the port 26. Accordingly, both of the cylinder chambers in the power cylinder 12 are communicated with each other through the passage 20, the ports 21, 26, the slit 30, and the ports 25, 19. The opening between the slit 30 and the port 26 is increased in proportion to the displacement amount of the second spool valve 27. An amount of bypass fluid through both of the cylinder chambers in the power cylinder 12 is therefore increased in proportion to increase in the vehicle speed. The steering gain is thus decreased depending upon the vehicle speed when the vehicle is running at high speed, which can prevent the manipulation of the steering wheel from being too light.

In this manner, the steering gain is decreased when the vehicle is running at high speed. However, when the steering wheel is abruptly turned at high speed running, steering pressure caused by the abrupt turning of the steering wheel is applied on the first spool valve 22. When the steering wheel is turned to the right, pressurized fluid in the left chamber of the power cylinder 12 is applied to the stepped portion of the first spool valve 22 through the passage 20 and the port 21. When the steering wheel is turned to the left, pressurized fluid in the right chamber of the power cylinder 12 is applied to the bottom portion of the first spool valve 22 through the port 19.

Accordingly, when the steering wheel is abruptly turned with of the slit 30 of the second spool valve 27 being fully opened or at the high speed running of the vehicle, pressurized fluid from the power steering device 12 is applied to the stepped portion or the bottom portion of the first spool valve 22. When pressure of the fluid is larger than the force of the spring 24, the first spool valve 22 is displaced upward. Upward displacement of the first spool valve 22 causes displacement of the second spool valve 27 in the same direction. An amount of displacement of the second spool valve 27 is smaller than that of the first spool valve 22 due to the existence of the spring 28, so that the opening area of the slit 30 is decreased to reduce the bypass amount of fluid. Therefore, the steering gain is increased to make the abrupt turning of the steering wheel easy. When the first spool valve 22 is displaced into abutting engagement with the end cap 23, the opening area of the slit 30 is maintained constant.

Figure 7:
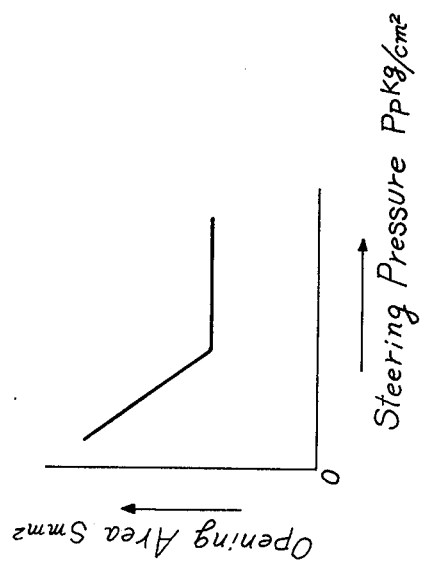
FIG. 7 shows a relationship between a steering pressure and an opening area of a slit.

FIG. 7 shows the relationship between the steering pressure Pp generated at the turning of the steering wheel and the opening area S of the slit 30. It is seen from FIG. 7 that the opening area of the slit 30 is decreased as the steering pressure is increased.

When fluid temperature is normal at T1 degree, control pressure from the trochoid pump 50 relative to the vehicle speed changes in accordance with the curve $\alpha$ in FIG. 6. However, at the start of the vehicle running, fluid temperature is relatively low and therefore at the temperature T2 lower than the normal temperature T1, so that control pressure relative to the vehicle speed changes in accordance with the curve $\beta$ whose rising gradient is steeper than that of the curve $\alpha$. Accordingly, control pressure P0 which is required to move the second spool valve 27 is obtained at the vehicle speed V2 (for example 60 km/h) under the normal temperature T1, while under the temperature T2 the control pressure P0 is obtained at the vehicle speed V0 lower than V2.

However, according to the present invention, back pressure applied on the top surface of the second spool valve 27 through the conduit 33 changes also in accordance with fluid temperature. Assuming that back pressure at the temperature T2 is higher by $\Delta P$ than that at the normal temperature T1, control pressure required to move the second spool valve 27 is P1 which is higher by $\Delta P$ than P0. This control pressure P1 is obtained at the vehicle speed V1 higher than V0 at the temperature T2. Accordingly, the second spool valve 27 is prevented from moving at relatively low vehicle speed.

Obviously, numerous modifications and variations of the present invention are possible in light of the above teachings. It is to be understood, therefore, that within the scope of the appended claims, the invention may be practiced otherwise than as specifically described herein.

What is claimed as new and desired to be secured by Letters Patent of the United States is:

1. A power steering device for a vehicle comprising:
A hydraulic actuator having two cylinder chambers for supplementing manual steering torque;
servo valve means for controlling directions of fluid pressure to be supplied to said hydraulic actuator in response to manual steering;
a valve housing;
a first spool valve member slidably received in said valve housing and supplied with a steering pressure generated in response to the manual steering torque for movement in one direction;
a second spool valve member slidably received in said first spool valve member and supplied with a control pressure depending upon the vehicle speed for movement in the one direction relative to said first spool valve member;
bypass means formed on said first and second spool valve members, said bypass means to be opened by the relative displacement between said first and second spool valve members caused by the control pressure to communicate both of said cylinder chambers of said hydraulic actuator with each other; and
first spring means interposed between said valve housing and said second spool valve member to urge said second spool valve member in the other direction to close said bypass means and second spring means between said first and second spool valve members to urge said second spool valve member in the one direction, said first and second spring means being calibrated in such a manner that the displacement of said first spool valve member by the steering pressure causes displacement of said second spool valve member by an amount different from that of said first spool valve member thereby to act to close said bypass means.

2. A power steering device for a vehicle comprising:
a hydraulic actuator having two cylinder chambers for supplementing manual steering torque;
servo valve means for controlling directions of fluid pressure to be supplied to said hydraulic actuator in response to manual steering;
a valve housing formed with first and second ports respectively communicating said two cylinder chambers of said hydraulic actuator;
a first spool valve member slidably received in said valve housing and provided with bottom and stepped portions to be supplied with a steering pressure generated in response to the manual steering torque from said first and second ports, respectively, for movement in one direction, said bottom portion being provided with a third port communicating with said first port;
a second spool valve member slidably received in said first spool valve member and supplied with a control pressure depending upon the vehicle speed for movement in the one direction relative to said first spool valve member;
bypass means formed on said first and second spool valve members to be opened by the displacement of said second spool valve member relative to said first spool valve member caused by the control pressure to communicate said first and second ports with each other; and
first spring means interposed between said valve housing and said second valve member to urge said second spool valve member in the other direction to close said bypass means and second spring means between said first and second spool valve members to urge said second spool valve member in the one direction, said first and second spring means being calibrated in such a manner that the displacement of said first spool valve member by the steering torque causes displacement of said second spool valve member by an amount smaller than that of said first spool valve member thereby to act to close said bypass means.

3. A power steering device as claimed in claim 1 or 2, wherein said second spool valve member communicates with an exhaust port, for exhausting fluid from said hydraulic actuator, so as to be applied with a back pressure to be moved in the other direction.

4. A power steering device as claimed in claim 1 or 2 further comprising a pump for generating the control pressure depending upon the vehicle speed and a relief valve connected between said pump and said second spool valve member for maintaining the control pressure below a pedetermined value.

5. A power steering device as claimed in claim 4, wherein said pump is a trochoid pump driven by an engine output shaft of the vehicle.

* * * * *